Feb. 20, 1951     W. G. SHERMAN ET AL     2,542,584
CONCRETE BLOCK MOLDING MACHINE
Filed Aug. 15, 1947     4 Sheets-Sheet 3

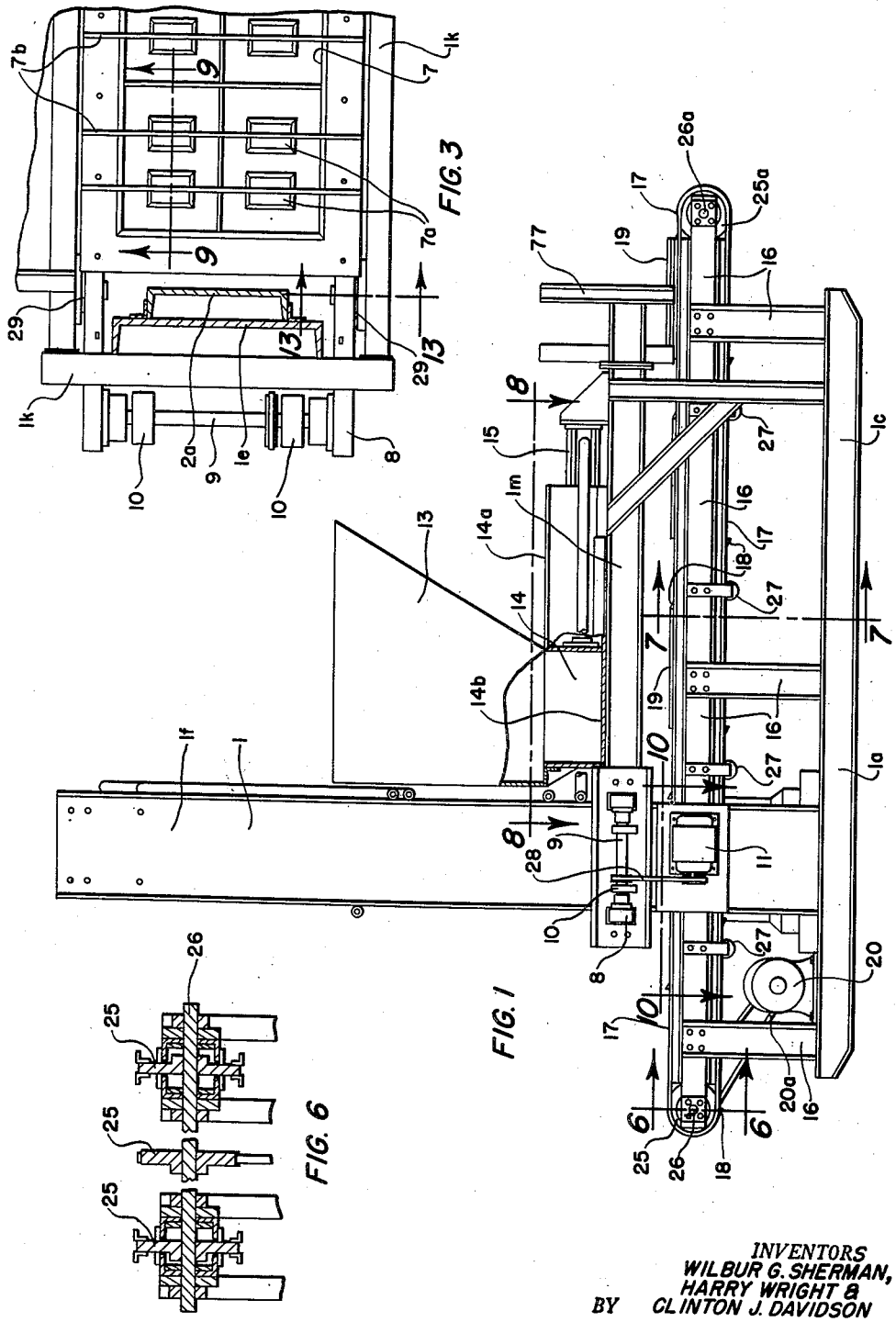

INVENTORS
WILBUR G. SHERMAN,
HARRY WRIGHT &
BY   CLINTON J. DAVIDSON

Wm. H. Dean
AGENT

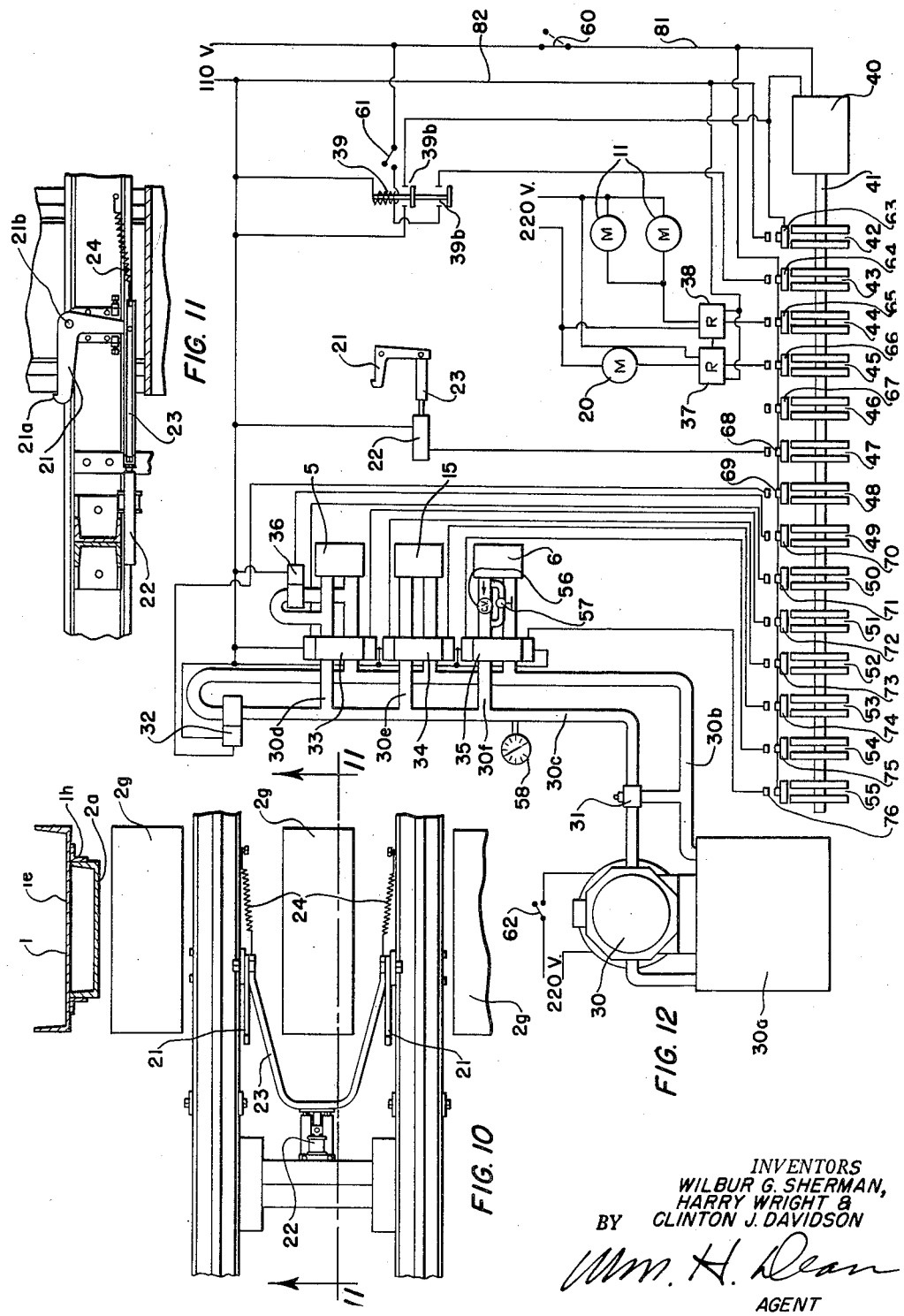

Patented Feb. 20, 1951

2,542,584

UNITED STATES PATENT OFFICE 2,542,584

CONCRETE BLOCK MOLDING MACHINE

Wilbur G. Sherman, Harry Wright, and Clinton J. Davidson, San Diego, Calif., assignors to Accurate Tool and Engineering Company, San Diego, Calif., a copartnership consisting of Elton W. Duff and Harry Wright Application August 15, 1947, Serial No. 768,842

9 Claims. (Cl. 25—41)

Our invention relates to a concrete block molding machine, and the objects of our invention are:

First, to provide an entirely automatic concrete block molding machine.

Second, to provide a concrete block molding machine of this class in which the cycle of operation may be readily varied by electrical timing devices as desired.

Third, to provide a machine of this class in which the various operations performed in sequence may be timed in accordance to requirements of various materials being molded by the machine, and such variations may be readily accomplished by simple adjustment of electrical timing switches.

Fourth, to provide a concrete molding machine of this class which is entirely hydraulically and electrically controlled.

Fifth, to provide a machine of this class having electrically operated control switches remotely controlled to the vibrating mechanism of the machine whereby said switches are undisturbed and operate very accurately.

Sixth, to provide a machine of this class having high production capacity.

Seventh, to provide a machine of this class which receives a mixture of material and delivers formed blocks on pallets automatically.

Eighth, to provide a machine of this class which may be interrupted during any one of the various sequences of operation involved in forming concrete blocks if desired.

Ninth, to provide a machine of this class which produces blocks of a very high quality and of reasonably precise dimensional tolerances, and Tenth, to provide a machine of this class which is very simple and economical in proportion to its utility, efficient, durable, and which will not readily deteriorate or get out of order.

Figures 2, 4, 5, 13:
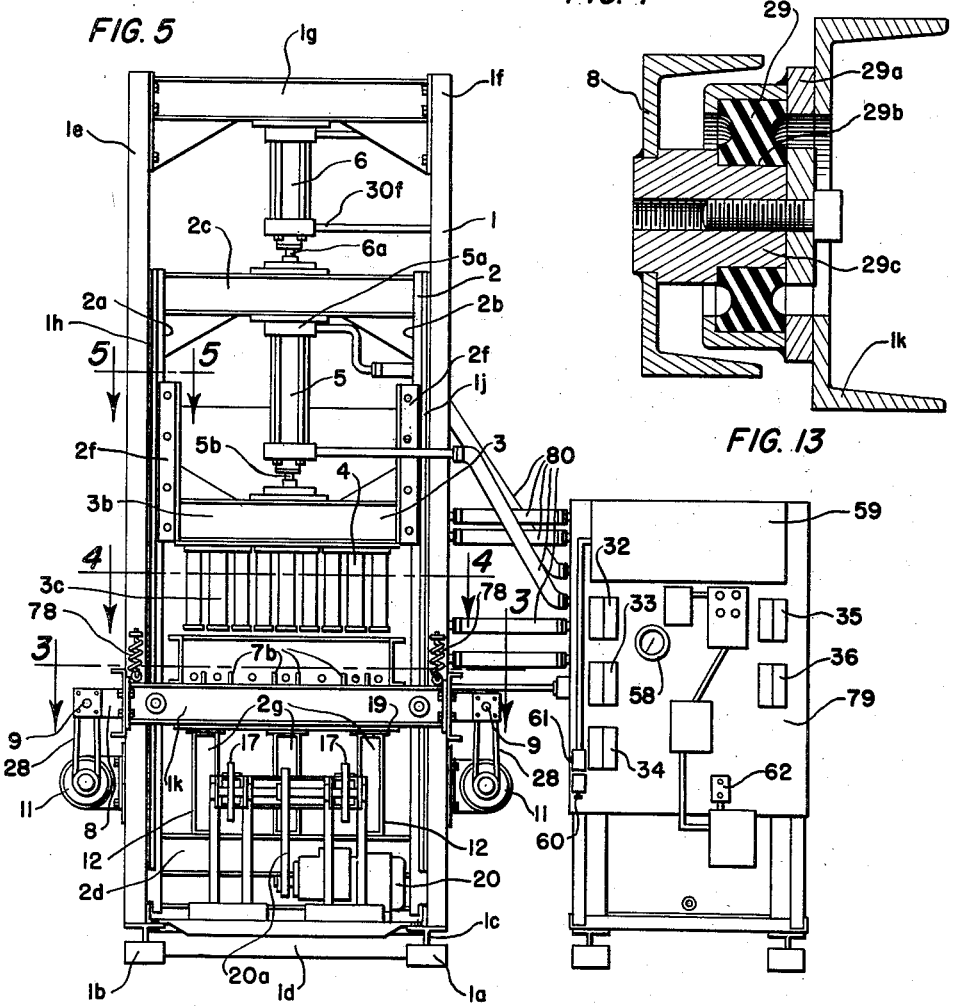
Figure 7:
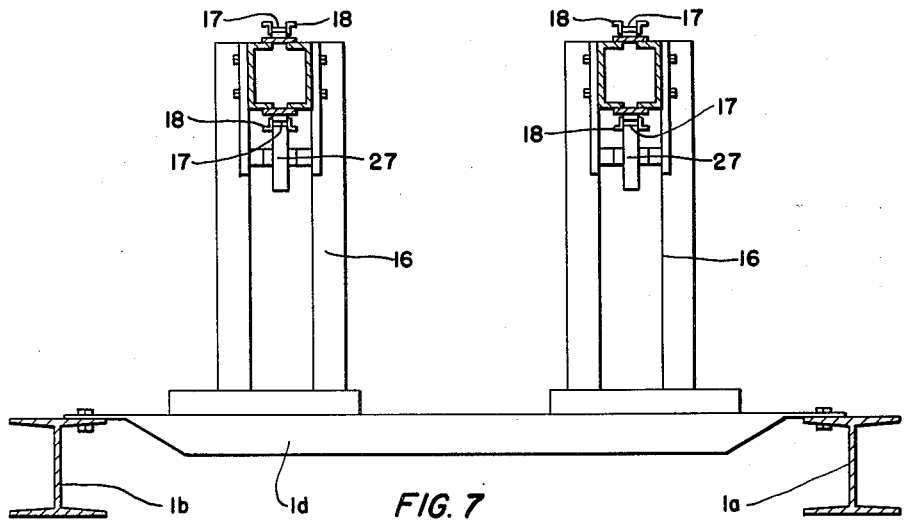
Figure 8:
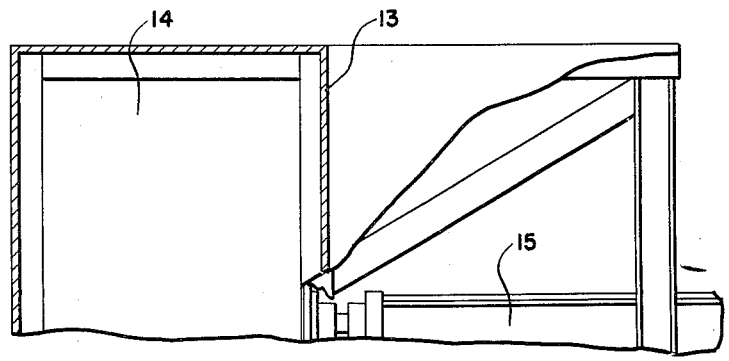
Figure 9:
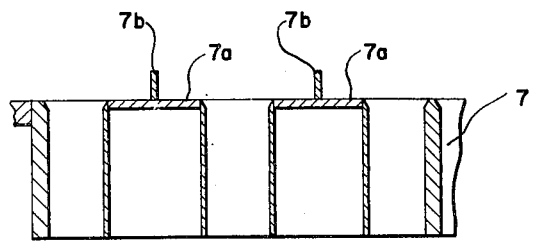

With these and other objects in view, as will appear hereinafter, our invention consists of certain novel features of construction, combination and arrangement of parts and portions as will be hereinafter described in detail and particularly set forth in the appended claims; reference being had to the accompanying drawings and to the characters of reference thereon forming a part of this application in which: Figure 1 is a side elevational view of our concrete block molding machine showing portions thereof broken away and in section to amplify the illustration; Figure 2 is a front elevational view of our concrete block molding machine; Figure 3 is a fragmentary plan sectional view taken from the line 3—3 of Figure 2; Figure 4 is an enlarged fragmentary plan sectional view taken from the line 4—4 of Figure 2; Figure 5 is an enlarged fragmentary plan sectional view taken from the line 5—5 of Figure 2; Figure 6 is an enlarged fragmentary sectional view taken from the line 6—6 of Figure 1; Figure 7 is an enlarged transverse sectional view taken from the line 7—7 of Figure 1; Figure 8 is an enlarged plan sectional view taken from the line 8—8 of Figure 1; Figure 9 is an enlarged fragmentary sectional view taken from the line 9—9 of Figure 3; Figure 10 is a fragmentary plan sectional view taken from the line 10—10 of Figure 1 showing the structure on an enlarged scale; Figure 11 is a fragmentary sectional view taken from the line 11—11 of Figure 10; Figure 12 is a diagrammatic view showing in combination the hydraulic and electrical control means of our concrete block molding machine, and Figure 13 is an enlarged sectional view taken from the line 13—13 of Figure 3.

Similar characters of reference refer to similar parts and portions throughout the several views of the drawing.

The main frame 1, stripper frame 2, compression frame 3, compression legs 4, compression cylinder 5, stripper frame operating cylinder 6, mold 7, mold vibrating frame 8, shafts 9, eccentric vibrators 10, vibrator motors 11, pallet legs 12, hopper 13, feed box 14, feed box actuating cylinder 15, conveyor frame 16, conveyor chains 17, cleats 18, pallets 19, conveyor motor 20, pallet stop levers 21, solenoid 22, link 23, springs 24, conveyor sprocket 25, shafts 26, chain idler rollers 27, belts 28, mold frame mounts 29, hydraulic pump 30, pressure relief valve 31, solenoid valves 32, 33, 34, 35 and 36, relays 37 and 38, holding coil 39, timer motor 40, timer shaft 41, timer cams 42, 43, 44, 45, 46, 47, 48, 49, 50, 51, 52, 53, 54, and 55, check valve 56, throttle valve 57, gauge 58, timer case 59, switches 60 to 76 inclusive, pallet frame 77, springs 78, control panel 79, and the flexible tubes 80 constitute the principal parts and portions of our concrete block molding machine.

The frame 1 is provided with a base portion 1a consisting of two runners 1b and 1c interconnected by cross members 1d adapted to support our concrete block molding machine on the ground. Secured to the runners 1b and 1c are upright channels 1e and 1f respectively interconnected at their upper ends by the cross member 1g to the lower portion of which is connected the stripper frame operating cylinder 6 all as shown best in Figures 1 and 2 of the drawings. Secured to the inner sides of the upright members 1e and 1f of the frame 1 are angle members 1h and 1j respectively. These angle members 1h and 1j form slide ways for the stripper frame 2. This stripper frame 2 consists of a pair of channels 2a and 2b as shown in Figure 4 of the drawing interconnected at their upper ends by a cross member 2c and interconnected at their lower ends by a cross member 2d. The plunger 6a of the cylinder 6 is secured to the upper cross member 2c of the stripper frame 2 and supports the same in the main frame 1. The cylinder 6 is a hydraulic cylinder arranged to extend and retract the plunger 6a for reciprocal movement of the stripper frame 2 in the main frame 1. Secured to the side edges of the channels 2a and 2b of the stripper frame 2 are guide ways 2c and 2f as shown in Figure 5 of the drawing. These guide ways 2e and 2f are secured to the channel members 3a of the compression frame 3 providing vertical reciprocal guiding means for the compression frame 3 in its longitudinal movement of the stripper frame 2. The hydraulic cylinder 5 is provided with a base portion 5a connected to the cross member 2c of the stripper frame 2, and the plunger 5b of this hydraulic cylinder 5 is secured to the cross member 3b of the compression frame 3 as shown best in Figure 2 of the drawing, which cross member 3b interconnects the channel members 3a of said compression frame 3 at its lower end. Connected to this compression frame 3 are the stripper legs 3c which extend downwardly from the cross member 3b, and these stripper legs 3c as shown in Fig. 4 of the drawing are provided with open spaces 3d arranged to bypass the cores 7a of the mold 7 together with the supports 7b in connection with said cores 7a. The frame 1 is provided with a box shaped mold supporting structure 1k which is secured at its opposite end to the uprights 1e and 1f of said frame 1 at the outer sides thereof as shown best in Figure 3 of the drawings. Secured to this mold supporting structure 1k are resilient rubber mounts 29 which are the mold frame mounts. These mounts are supported in a cup 29a fixed to the box 1k and the internal bore portions 29b receive the trunnion 29c connected to the mold frame 8. Thus, the mold frame 8 is resiliently supported in connection with the main frame 1 and the springs 78 tend to exert vertical tension in connection with the mold frame 8 for reloading the mold frame mounts 29 and compensating for the weight of the mold 8 together with the load therein permitting free vibration thereof when acted upon by the eccentric vibrators 10. These eccentric vibrators 10 are discs eccentrically mounted on the shafts 9 rotatively operated by the motors 11. These motors 11 are identical motors secured to the uprights 1e and 1f of the frame 1 as shown best in Figure 2 of the drawings. As shown in Figure 2 of the drawings the shafts 9 are mounted at their opposite ends in the mold frame 8, and this mold frame 8 rigidly supports the mold 7 in which the hollow cores 7a are suspended by the cross members 7b all as shown best in Figs. 2 and 3 of the drawings. It will be here noted that the mold 7 together with the stripper feet 3c in connection with the compression frame 3 may be varied in form in order to produce different bricks as desired. The hopper 13 is arranged to receive a relatively dry mix of concrete, and the concrete is arranged to gravitate into the feed box 14 to the rear side of which is connected the plunger of the hydraulic cylinder 15. This feed box 14 is slidably supported on the rails 1m of the frame 1 and is arranged to pass over the upper side of the mold 7 by action of the hydraulic cylinder 15. Contiguous with the top of the feed box 14 and connected to the rear thereof is a screen plate 14a arranged to close off the lower delivery opening of the hopper 13 when the feed box 14 is disposed over the mold 7 for dumping concrete thereinto. The forward side of the feed box 14 at its lower edge is notched out to pass over the supports 7b of the core 7a in the mold 7 as shown best in Figure 2 of the drawings. The conveyor frame 16 is fixed to the runners 1b and 1c of the main frame 1, and opposite ends of this conveyor frame 16 support the shafts 26 on which the sprockets 25 are arranged to support the conveyor chain 17. These conveyor chains 17 have laterally disposed cleats 18 arranged to engage the pallets 19 which gravitate in the pallet frame 17 in stacked relationship to each other as shown on Figure 1 of the drawings. Thus, each cleat 18 successively picks up one of the pallets 19 and directs it toward the lower side of the mold 7 during operation. The rollers 27 are supported in connection with the conveyor frame 16 and are chain idler rollers arranged to prevent sag of the conveyor chains 17. It will be here noted that the pallets 19 may be made of plywood or any other suitable flat material and require no special shaping or forming operations, and are arranged to engage the pallet stop levers 21 which are each provided with a hook portion 21a arranged to engage the pallets 19 on the conveyor chains 17 for stopping the same at precise location under the mold 7. This pallet stop lever 21 is pivoted on a pin 21b and is connected at its lower end to the link 23, secured to the solenoid 22 which is arranged to electrically actuate the pallet stop lever 21 in opposed relationship to the spring 24 at a predetermined time after the operation of the motor 20 has been discontinued in driving the conveyor chains 17 on the sprockets 25 so that the pallets 19 will be precisely located as will be hereinafter described in the operation of our concrete block molding machine. It will be here noted that the stop levers 21 as shown in Figure 10 of the drawings are each identical and are disposed at opposite sides of the conveyor adjacent the conveyor chain 17. Secured to the lower cross member 2d of the stripper frame 2 are pallet supporting legs 2g which are arranged to raise pallets 19 successively after the pallet stop levers 21 interrupt the same in connection with the conveyor as will be hereinafter described in the operation of our concrete block molding machine. The motor 20 drives the conveyor by means of the belt 20a operating over a pulley in connection with the shaft 26 as shown in Figure 1 of the drawings. The control panel 79 is substantially isolated from the mechanism of our concrete block molding machine by the flexible hydraulic tubes 80 and flexible electrical conduits so that vibration is substantially eliminated in the control panel 79 wherein intricate electrical switching and hydraulic operating mechanism is applied to control the motors and hydraulic cylinders of our concrete block molding machine. It has been determined that exact and proper timing of such machines cannot be accomplished where the timing switches are subject to vibration. Therefore, all connections between the mechanism supported by the frame 1 and the control panel 79 are flexible, substantially preventing the transfer of vibration from the vibrating mechanism of the machine to the control mechanism thereof. Supported on the control panel 79 are the solenoid valves 32 to 36 inclusive, pressure relief valve 31, relays 37 and 38, holding coil 39, timer motor 40, timer shaft 41, cams 42 to 45 inclusive, check valve 56, relief valve 57, gauge 58, timer case 59, and switches 60 to 76 inclusive. Referring to the diagrammatic view of the hydraulic and electrical equipment of our concrete block molding machine, it will be noted that the hydraulic pump 30 is positioned rearwardly of the control panel 79 and employs a reservoir 30a. Communicating with the outlet of the pump 30 is a pressure relief valve 31. This pressure relief valve 31 provides a bypass of fluid into the tubular return conductor 30b communicating with the reservoir 30a when the pressure reaches a predetermined value in the tubular conductor 30c communicating with the solenoid valves 32 to 36 inclusive. Thus a constant operating pressure for the solenoid valves together with the hydraulic cylinders controlled thereby is maintained. The gauge 58 indicates the pressure in the tubular conductor 30c and is disposed on the front side of the control panel 79 as shown best in Figure 2 of the drawings. The solenoid valve 32 communicates with the outlet tube 30c of the pump 30 and is controlled by the switch 69. This solenoid valve 32 is arranged to stop the flow of fluid through the tube 30c and backwardly through the tube 30b into the reservoir 30a in order to direct the fluid into the solenoid valves 33, 34, and 35 for distribution to the cylinders 5, 6, and 15. Thus the pressure relief valve 31 comes into operation after the solenoid valve 32 closes the conductor tube 30c beyond the tubes 30d, 30e, and 30f which communicate with the solenoid valves 33, 34, and 35 respectively. These solenoid valves 33, 34, and 35 are three position valves of the conventional type arranged to control the inlet and outlet conductors of the cylinders 5, 6, and 15. The solenoid valve 35 is a momentary relief valve for the hydraulic cylinder 5 and controls flow from the inlet to the cylinder 5 to the outlet thereof whereby fluid may be momentarily bypassed to break the pressure in the cylinder as will be hereinafter described in detail. The throttle valve 57 is cooperatively connected to the check valve 56 communicating with the inlet tube 30f arranged to conduct fluid to the stripper frame operating cylinder 6. The check valve 56 is arranged to prevent flow from the cylinder 6 through the tube 30f, and the throttle valve 57 is arranged to permit limited bypass of fluid around the check valve from the cylinder 6 to the tube 30f so that radical downward movement of the stripper frame 2 is prevented, and the speed thereof is controlled by the rate of flow of fluid through said throttle valve 57.

The operation of our concrete block molding machine is substantially as follows: The switch 62 is closed and the pump 30 circulates fluid through the tube 30c and backwardly through the tube 30b and into the pump 30a. The switch 61 is closed manually which energizes the holding coil 39 and automatically closing the contacts 39a and 39b which are bridge contacts in connection with the reciprocal core of the solenoid holding coil 39. Closing of the contacts 39b energizes the motor 40 which starts rotation of the shaft 41. Closing of the contacts 39b provides a conductor from one side of the holding coil 39 to the switch 64 which is connected to the electrical conductor 81. As the shaft 41 is rotated by the motor 40, the contacts 63 close which provides uninterrupted relationship of the conductor 82 with the motor 40. Thus the shaft 41 continues to rotate until the contacts 64 close. When the contacts 64 close, the holding coil 39 maintains the closed circuit to the motor 41 through the contacts 39b. Then the switch 69 is closed operating the solenoid valve 32 which closes off the tubular conductor 30c. Immediately pressure rises in the tube 30c and bleeds off through the relief valve 31 after reaching a predetermined pressure. The switch 73 then closes operating the solenoid valve 34 and supplying fluid under pressure to the hydraulic cylinder 15 which causes the plunger thereof to be extended sliding the feed box 14 into position over the mold 7, it being noted that the feed box 14 is open at its upper and lower sides and is supported on an enclosing plate 14b which is a stationary plate preventing leakage of material passing into the feed box 14 from the hopper 13. The motors 11 are then energized by means of the switch 65. At this time the switch 73 opens and the switch 74 closes causing pressure to be reversed in the hydraulic cylinder 15 retracting the plunger thereof together with the feed box 14. It will be noted that during the vibration set up by the motors 11 in connection with the shafts 9 and the mold frame 8 that one of the pallets 19 is maintained in secure supported relationship at the lower side of the mold 7 by means of the legs 2g of the stripper frame 2. The next switch to close is the switch 71 which causes extension of the plunger 5b of the hydraulic cylinder 5. This extends the legs 3c of the compression frame 3 downwardly into engagement with the settled concrete in the mold 7. The cylinder 5 is arranged to exert considerable pressure on the upper side of the concrete blocks for surfacing them, and then the solenoid valve 36 is operated for a very short period of time by momentary closing of the switch 7 which bypasses fluid from the inlet or high pressure line to the low pressure line whereby the pressure exerted on the plunger 5b in the piston 5 is relaxed momentarily. At this time the switch 75 in connection with the solenoid valve 35 admits fluid under pressure to the upper side of the plunger 6a of the stripper frame operating cylinder 6. Relaxation of pressure on the concrete in the mold 7 due to release of pressure in the cylinder 5 prevents the concrete from seizing in the mold 7 and permits the cylinder 6 to force the stripper frame 2 downwardly at which time pressure again is resumed in the cylinder 5. This forces the concrete blocks out of the mold 7 and pressure of the legs 3c in connection with the compression frame 3 is resisted by the pallet 19 on the supporting legs 2g of the stripper frame 2. The stripper frame continues to move downwardly until the pallet 19 rests on the conveyor chain 17 at which time the switch 72 closes and the switch 71 opens retracting the compression legs 3c together with the compression frame 3. This operation is caused by electrical actuation of the solenoid valve 33 which reverses flow of the hydraulic fluid at opposite ends of the cylinder 5 so that pressure on the upper sides of the concrete block is relieved slightly before the pallet 19 reaches the conveyor chains 17. When the pallet 19 carrying the concrete blocks rests upon the conveyor chains 17, the motor 20 is electrically energized by means of the switch 66 operating in conjunction with the relay 37 which moves the conveyor forward placing a new pallet under the mold 7 and delivering the formed concrete blocks on a pallet in the front of the machine. As the new pallet nears its precise position under the mold 7, the solenoid 22 is energized by means of the electrical switch 68 and the pallet stop lever 21 engages the edge of the pallet as shown in Figure 11 of the drawing precisely locating the same. It will be noted that the timing operation carried on in connection with the switch 66 is so limited by the discs 45 that the motor operates for a certain length of time and is automatically shut off. Thus the pallet stop lever 21 stops the conveyor at the precise position for locating a new pallet under the mold 7. Then the switch 76 is closed and the switch 75 is opened permitting the plunger 6a in the cylinder 6 to be retracted moving the stripper frame 2 upwardly carrying a new pallet on the legs 2g into flush position with the lower side of the mold 7. It will be here noted that the switch 61 is simply a starting switch, and after the motor 40 is once started, it is constantly energized through the contacts 63 and 64 until such time as the switch 64 is opened for stopping the machine. Each revolution of the shaft 41 closes the switch 63 prior to the opening and closing of the switch 64 so that these switches 63 and 64 alternate for continually operating the motor 40 unless shut off by means of the emergency switch 60. The discs 42 to 55 inclusive operate the switches 63 to 76 inclusive and these switches are conventional disc actuated switches manufactured by the Eagle Signal Corporation of Moline, Illinois. Such switches are identified in the bulletin 267 and termed "multiple circuit program timers." It will be here noted that variation in the cam surfaces of the discs 42 to 55 respectively may be made to control time intervals of various operations of our concrete block molding machine and the radial disposition of such cam surfaces may be readily changed to adjust the sequence of such operations. It will be here noted that vibration set up by means of motors 11 driving the shafts 9 having the eccentric vibrators 10 in connection therewith cause the mold frame 8 to vibrate on the resilient rubber mounts 29. These mounts 29 completely isolate the mold frame from the main frame 1, but considerable vibration is transmitted thereto. Therefore, all of the hydraulic connections from the control panel 79 bearing the solenoid valves to which they are connected are interconnected by the flexible tubes 80 which substantially prevent the transfer of vibration from the mechanical structure of our concrete block molding machine to the intricate timing devices and hydraulic valves. The motor 40 together with the timing discs and switches in connection therewith are very sensitive and are very accurate in sequence timing, therefore must be isolated from the vibrating structure of the machine. It will be here noted that the shaft 41 in connection with the motor 40 rotates slowly and makes one revolution with each complete cycle of our concrete block molding machine.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a concrete block molding machine of the class described, the combination of a main frame, a mold mounted on said frame, vibrating means connected to said mold, a movable stripper frame on said main frame movable laterally of said mold, hydraulic cylinder and piston means interconnecting said main frame and said stripper frame for moving said stripper frame relatively to said main frame, an endless conveyor below said mold arranged to convey pallets thereunder, and means connected to said stripper frame for raising pallets from said conveyor to the lower side of said mold, a second hydraulic cylinder and plunger means and a compression frame having stripper legs thereon, said second hydraulic cylinder and plunger means interconnecting said stripper frame and said compression frame for compressing material in said mold, a hopper at one side of said mold, a reciprocally mounted feed box below said hopper, hydraulic cylinder and plunger means interconnecting said main frame and said feed box for moving the same over said mold, a timer having a plurality of electrical switches in connection therewith, and solenoid valves communicating with each of said hydraulic cylinders, said electrical switch means arranged to operate in sequence all of said hydraulic cylinders and said vibrating means, operating in sequence said solenoid valves and said vibrating means.

2. In a concrete block molding machine of the class described, the combination of a main frame, a mold mounted on said frame, vibrating means connected to said mold, a movable stripper frame on said main frame movable laterally of said mold, hydraulic cylinder and piston means interconnecting said main frame and said stripper frame for moving said stripper frame relatively to said main frame, an endless conveyor below said mold arranged to convey pallets thereunder, and means connected to said stripper frame for raising pallets from said conveyor to the lower side of said mold, a second hydraulic cylinder and plunger means and a compression frame having stripper legs thereon, said second hydraulic cylinder and plunger means interconnecting said stripper frame and said compression frame for compressing material in said mold, a hopper at one side of said mold, a reciprocally mounted feed box below said hopper, hydraulic cylinder and plunger means interconnecting said main frame and said feed box for moving the same over said mold, a timer having a plurality of electrical switches communicating therewith, and solenoid valves in connection with each of said hydraulic cylinders, said electrical switch means arranged to operate in sequence all of said hydraulic cylinders and said vibrating means, operating in sequence said solenoid valves and said vibrating means, said switch means and said solenoid valves flexibly connected with said hydraulic cylinders and said vibrating means.

3. In a concrete block molding machine of the class described, the combination of a main frame, a mold mounted on said frame, vibrating means connected to said mold, a movable stripper frame on said main frame movable laterally of said mold, hydraulic cylinder and piston means interconnecting said main frame and said stripper frame for moving said stripper frame relatively to said main frame, an endless conveyor below said mold arranged to convey pallets thereunder, and means connected to said stripper frame for raising pallets from said conveyor to the lower side of said mold, a second hydraulic cylinder and plunger means and a compression frame having stripper legs thereon, said second hydraulic cylinder and plunger means interconnecting said stripper frame and said compression frame for compressing material in said mold, a hopper at one side of said mold, a reciprocally mounted feed box below said hopper, hydraulic cylinder and plunger means interconnecting said main frame and said feed box for moving the same over said mold, a timer having a plurality of electrical switches in connection therewith, and solenoid valves communicating with each of said hydraulic cylinders, said electrical switch means arranged to operate in sequence all of said hydraulic cylinders and said vibrating means, operating in sequence said solenoid valves and said vibrating means, said switch means and said solenoid valves flexibly connected with said hydraulic cylinders and said vibrating means, a motor for operating said conveyor electrically connected with said switch means whereby said conveyor is intermittently operated in unison with said stripper frame.

4. In a concrete block molding machine of the class described the combination of a main frame, a stripper frame reciprocally mounted thereon, a hydraulic cylinder having a plunger for actuating said stripper frame in said main frame, a compression frame reciprocally mounted on said stripper frame, a second hydraulic cylinder having a plunger for operating said compression frame on said stripper frame, a mold yieldably mounted on said main frame and relatively stationarily located thereon, vibrating means connected to said mold, a third hydraulic cylinder mounted on said main frame at the side of said mold and having a plunger, a feed box in connection with the plunger of said third hydraulic cylinder for moving said feed box over said mold, a hopper over said feed box, a conveyor below said mold, means connected to said stripper frame arranged to elevate pallets from said conveyor to the bottom of said mold, said compression frame having compression legs therein arranged to be extended through said mold for ejecting blocks from said mold onto said pallet.

5. In a concrete block molding machine of the class described the combination of a main frame, a stripper frame reciprocally mounted thereon, a hydraulic cylinder having a plunger for actuating said stripper frame in said main frame, a compression frame reciprocally mounted on said stripper frame, a second hydraulic cylinder having a plunger for operating said compression frame on said stripper frame, a mold yieldably mounted on said main frame and relatively stationarily located thereon, vibrating means connected to said mold, a third hydraulic cylinder mounted on said main frame at the side of said mold and having a plunger, a feed box in connection with the plunger of said third hydraulic cylinder for moving said feed box over said mold, a hopper over said feed box, a conveyor below said mold, means connected to said stripper frame arranged to elevate pallets from said conveyor to the bottom of said mold, said compression frame having compression legs therein arranged to be extended through said mold for ejecting blocks from said mold onto said pallet, a motor for operating said conveyor, an electrically operated stop lever arranged to precisely locate pallets under said mold, and electrical switch means timed for sequence operation of said pallet stop lever with said motor in operating said conveyor.

6. In a concrete block molding machine of the class described the combination of a main frame, a stripper frame reciprocally mounted thereon, a hydraulic cylinder having a plunger for actuating said stripper frame in said main frame, a compression frame reciprocally mounted on said stripper frame, a second hydraulic cylinder having a plunger for operating said compression frame on said stripper frame, a mold yieldably mounted on said main frame and relatively stationarily located thereon, vibrating means connected to said mold, a third hydraulic cylinder mounted on said main frame at the side of said mold and having a plunger, a feed box in connection with the plunger of said third hydraulic cylinder for moving said feed box over said mold, a hopper over said feed box, a conveyor below said mold, means connected to said stripper frame arranged to elevate pallets from said conveyor to the bottom of said mold, said compression frame having compression legs therein arranged to be extended through said mold for ejecting blocks from said mold onto said pallet, a motor for operating said conveyor, an electrically operated stop lever arranged to precisely locate pallets under said mold, and electrical switch means timed for sequence operation of said pallet stop lever with said motor in operating said conveyor, said means for vibrating said mold including motors electrically connected with said switch means whereby cooperative timing of said vibrator is accomplished, solenoid valves hydraulically communicating with all of said hydraulic cylinders, said switch means electrically connected to said solenoid valves for cooperatively timing the sequence of the operation of said hydraulic cylinder, said conveyor and said vibrator.

7. In a concrete block molding machine of the class described the combination of a main frame, a stripper frame reciprocally mounted thereon, a hydraulic cylinder having a plunger for actuating said stripper frame in said main frame, a compression frame reciprocally mounted on said stripper frame, a second hydraulic cylinder having a plunger for operating said compression frame on said stripper frame, a mold yieldably mounted on said main frame and relatively stationarily located thereon, vibrating means connected to said mold, a third hydraulic cylinder mounted on said main frame at the side of said mold and having a plunger, a feed box in connection with the plunger of said third hydraulic cylinder for moving said feed box over said mold, a hopper over said feed box, a conveyor below said mold, means connected to said stripper frame arranged to elevate pallets from said conveyor to the bottom of said mold, said compression frame having compression legs therein arranged to be extended through said mold for ejecting blocks from said mold onto said pallet, a motor for operating said conveyor, an electrically operated stop lever arranged to precisely locate pallets under said mold, and electrical switch means timed for sequence operation of said pallet stop lever with said motor in operating said conveyor, said means for vibrating said mold including motors electrically connected with said switch means whereby cooperative timing of said vibrator is accomplished, solenoid valves hydraulically communicating with all of said hydraulic cylinders, said switch means electrically connected to said solenoid valves for cooperatively timing the sequence of the operation of said hydraulic cylinder, said conveyor and said vibrator, flexible conductors connecting said solenoid valves with said hydraulic cylinders arranged to prevent vibration from being transferred from said vibrator to said switch means.

8. In a concrete block molding machine of the class described the combination of a main frame, a stripper frame reciprocally mounted thereon, a hydraulic cylinder having a plunger for actuating said stripper frame in said main frame, a compression frame reciprocally mounted on said stripper frame, a second hydraulic cylinder having a plunger for operating said compression frame on said stripper frame, a mold yieldably mounted on said main frame and relatively stationarily located thereon, vibrating means connected to said mold, a third hydraulic cylinder mounted on said main frame at the side of said mold and having a plunger, a feed box in connection with the plunger of said third hydraulic cylinder for moving said feed box over said mold, a hopper over said feed box, a conveyor below said mold, means connected to said stripper frame arranged to elevate pallets from said conveyor to the bottom of said mold, said compression frame having compression legs therein arranged to be extended through said mold for ejecting blocks from said mold onto said pallet, a motor for operating said conveyor, an electrically operated stop lever arranged to precisely locate pallets under said mold, and electrical switch means timed for sequence operation of said pallet stop lever with said motor in operating said conveyor, said means for vibrating said mold including motors electrically connected with said switch means whereby cooperative timing of said vibrator is accomplished, solenoid valves hydraulically communicating with all of said hydraulic cylinders, said switch means electrically connected to said solenoid valves for cooperatively timing the sequence of the operation of said hydraulic cylinder, said conveyor and said vibrator, flexible conductors connecting said solenoid valves with said hydraulic cylinders arranged to prevent vibration from being transferred from said vibrator to said switch means, a pump arranged to provide fluid pressure to said solenoid valves for operating said hydraulic cylinders.

9. In a concrete block molding machine of the class described, the combination of a main frame, a stripper frame reciprocally mounted thereon, a hydraulic cylinder and plunger means interconnecting said main frame and said stripper frame, a compression frame reciprocally mounted on said stripper frame, a second hydraulic cylinder and piston means interconnecting said stripper frame and said compression frame, a mold yieldably mounted on said main frame and relatively stationarily located thereon, vibrating means connected with said mold, a third hydraulic cylinder and plunger means, a feed box connected with said main frame by said third hydraulic cylinder and piston means, whereby said feed box is movable on said main frame over said mold by said third hydraulic cylinder and plunger means, a hopper over said feed box, a conveyer below said mold, means connected to said stripper frame, arranged to elevate pallets from said conveyer to the bottom of said mold, said compression frame having compression legs thereon, arranged to be extended through said mold for ejecting blocks from said mold onto one of said pallets.

WILBUR G. SHERMAN.
HARRY WRIGHT.
CLINTON J. DAVIDSON.

REFERENCES CITED

The following references are of record in the file of this patent:

UNITED STATES PATENTS

| Number | Name | Date |
|---|---|---|
| 1,905,619 | Carton | Apr. 25, 1933 |
| 1,921,003 | Romie | Aug. 8, 1933 |
| 2,029,365 | Gelbman | Feb. 4, 1936 |
| 2,308,132 | Wellnitz | Jan. 12, 1943 |
| 2,341,012 | Billman et al. | Feb. 8, 1944 |
| 2,382,458 | Williams et al. | Aug. 14, 1945 |
| 2,407,168 | Lindkvist | Sept. 3, 1946 |